United States Patent
Mort et al.

(10) Patent No.: US 11,851,877 B2
(45) Date of Patent: Dec. 26, 2023

(54) STRUCTURAL INSULATED FINISHED CLADDING ASSEMBLIES

(71) Applicant: Dryvit Systems, Inc., West Warwick, RI (US)

(72) Inventors: Steven Douglas Mort, Cleveland Heights, OH (US); John Richard Bunting, Nashville, TN (US); Lester Charles Bundrick, Broomfield, CO (US)

(73) Assignee: TREMCO CPG INC., Beachwood, OH (US)

( * ) Notice: Subject to any disclaimer, the term of this patent is extended or adjusted under 35 U.S.C. 154(b) by 65 days.

(21) Appl. No.: 17/528,361

(22) Filed: Nov. 17, 2021

(65) Prior Publication Data

US 2022/0154467 A1    May 19, 2022

Related U.S. Application Data

(60) Provisional application No. 63/159,684, filed on Mar. 11, 2021, provisional application No. 63/114,833, filed on Nov. 17, 2020.

(51) Int. Cl.
*E04B 1/346* (2006.01)
*E04C 2/296* (2006.01)
(Continued)

(52) U.S. Cl.
CPC ............... *E04C 2/296* (2013.01); *B32B 3/04* (2013.01); *B32B 3/06* (2013.01); *B32B 3/30* (2013.01);
(Continued)

(58) Field of Classification Search
CPC ................................ B32B 3/04; E04B 1/7608
(Continued)

(56) References Cited

U.S. PATENT DOCUMENTS

| 1,040,045 | A |   | 10/1912 | Squier |
| 3,560,316 | A | * | 2/1971  | Soret ..................... E04C 2/32 |
|           |   |   |         | 52/309.1 |

(Continued)

FOREIGN PATENT DOCUMENTS

| DE | 3409592 B1 | 11/2002 |
| NL | 2014990 B1 | 1/2017 |

(Continued)

OTHER PUBLICATIONS

VolkerWessels, Energienotanul renovatie in een dag uitgevoerd, https://www.volkerwessels.com/nl/nieuws/energienotanul-renovatie-in-een-dag-uitgevoerd (machine translation included), downloaded Aug. 20, 2020, 10 pages.

(Continued)

*Primary Examiner* — Basil S Katcheves
(74) *Attorney, Agent, or Firm* — CALFEE, HALTER & GRISWOLD LLP

(57) ABSTRACT

An exterior building panel includes a panel body having a polymeric framing arrangement including an outer boundary portion extending around an outer perimeter of the panel body and a plurality of crossing frame members extending between opposed first and second sides of the outer boundary portion to define a plurality of cavities surrounded by the outer boundary portion, core insulation material disposed in each of the plurality of cavities, an insulation layer surrounding the framing arrangement and the core insulation material, and an insulating lamina coating covering the insulation layer.

20 Claims, 15 Drawing Sheets

(51) Int. Cl.
| | |
|---|---|
| *E04B 1/76* | (2006.01) |
| *E04C 2/38* | (2006.01) |
| *E04B 2/00* | (2006.01) |
| *B32B 3/30* | (2006.01) |
| *B32B 5/18* | (2006.01) |
| *B32B 7/12* | (2006.01) |
| *B32B 7/08* | (2019.01) |
| *B32B 27/30* | (2006.01) |
| *B32B 27/06* | (2006.01) |
| *B32B 3/04* | (2006.01) |
| *B32B 3/06* | (2006.01) |

(52) U.S. Cl.
CPC .................. *B32B 5/18* (2013.01); *B32B 7/08* (2013.01); *B32B 7/12* (2013.01); *B32B 27/065* (2013.01); *B32B 27/302* (2013.01); *E04B 1/7608* (2013.01); *E04B 1/7641* (2013.01); *E04B 1/7654* (2013.01); *E04C 2/388* (2013.01); *E04C 2/46* (2013.01); *B32B 2250/03* (2013.01); *B32B 2250/40* (2013.01); *B32B 2255/10* (2013.01); *B32B 2262/101* (2013.01); *B32B 2266/0228* (2013.01); *B32B 2307/304* (2013.01); *B32B 2307/3065* (2013.01); *B32B 2607/00* (2013.01)

(58) Field of Classification Search
USPC ...................................................... 52/125.4
See application file for complete search history.

(56) References Cited

U.S. PATENT DOCUMENTS

| | | | | |
|---|---|---|---|---|
| 3,573,144 | A * | 3/1971 | Andersen | E04C 2/243 156/212 |
| 3,898,115 | A * | 8/1975 | Watkins | B32B 3/04 D25/4 |
| 3,908,571 | A * | 9/1975 | Motsenbocker | A45C 13/26 2/338 |
| 3,920,871 | A * | 11/1975 | Johnson | B63B 5/24 52/309.4 |
| 3,924,038 | A * | 12/1975 | McArdle | B32B 3/04 428/116 |
| 4,361,613 | A * | 11/1982 | Bogner | E04B 1/942 156/212 |
| 4,457,500 | A * | 7/1984 | Drachenberg | B32B 3/10 428/113 |
| 4,463,043 | A * | 7/1984 | Reeves | B32B 27/36 428/313.5 |
| 4,471,592 | A * | 9/1984 | MacKinnon, Jr. | E04B 1/7675 52/712 |
| 4,573,304 | A * | 3/1986 | Mieyal | E04C 2/36 428/116 |
| 4,617,217 | A * | 10/1986 | Michaud-Soret | B29D 99/0003 428/117 |
| 4,662,521 | A * | 5/1987 | Moretti | B32B 3/04 206/524.8 |
| 4,720,948 | A | 1/1988 | Henley et al. | |
| 4,760,611 | A * | 8/1988 | Huet | B32B 15/14 2/2.5 |
| 4,852,310 | A | 8/1989 | Henley et al. | |
| 4,963,408 | A * | 10/1990 | Huegli | B61D 17/005 428/110 |
| 5,303,529 | A | 4/1994 | Guardia | |
| 5,644,871 | A * | 7/1997 | Cohen | E04B 5/04 52/125.4 |
| 5,679,432 | A * | 10/1997 | Holmquest | B32B 5/18 428/319.7 |
| 6,481,170 | B1 | 11/2002 | Savenok et al. | |
| 7,625,827 | B2 | 12/2009 | Egan et al. | |
| 8,171,686 | B1 | 5/2012 | Bao | |
| 8,316,603 | B2 | 11/2012 | Flynn et al. | |
| 8,621,810 | B2 | 1/2014 | Manser et al. | |
| 8,635,828 | B2 | 1/2014 | Bahnmiller | |
| 8,769,898 | B2 | 7/2014 | Carolan et al. | |
| 8,789,329 | B2 | 7/2014 | Radoane | |
| 8,806,825 | B2 | 8/2014 | Egan et al. | |
| 8,984,833 | B2 | 3/2015 | Manser et al. | |
| 9,074,366 | B2 | 7/2015 | Warren | |
| 9,145,680 | B2 | 9/2015 | Carolan et al. | |
| 9,157,229 | B2 | 10/2015 | Pargeter et al. | |
| 9,200,458 | B2 | 12/2015 | Harding | |
| 9,281,430 | B2 | 3/2016 | Carolan et al. | |
| 9,309,676 | B1 | 4/2016 | Szalacinski | |
| 9,453,344 | B2 | 9/2016 | Hall et al. | |
| 9,470,000 | B1 | 10/2016 | Ochi | |
| 9,499,978 | B2 | 11/2016 | Glancy | |
| 9,580,909 | B2 | 2/2017 | Hostetler et al. | |
| 9,725,903 | B2 | 8/2017 | Hostetler et al. | |
| 9,790,682 | B2 | 10/2017 | O'Neill | |
| 9,809,981 | B2 | 11/2017 | Ilarian | |
| 9,816,265 | B2 | 11/2017 | Vermeren | |
| 9,840,851 | B2 | 12/2017 | Propst | |
| 9,938,725 | B2 | 4/2018 | Johnson et al. | |
| 10,202,774 | B2 | 2/2019 | Jay et al. | |
| 10,273,682 | B2 | 4/2019 | Simontacchi et al. | |
| 10,294,667 | B2 | 5/2019 | Prygon | |
| 10,307,962 | B2 | 6/2019 | Dessel | |
| 10,663,178 | B2 | 5/2020 | Van Dyke | |
| 10,676,928 | B2 | 6/2020 | Smith | |
| 10,697,174 | B1 | 6/2020 | Bomberg et al. | |
| 10,704,263 | B2 | 7/2020 | Sailor et al. | |
| 2011/0197528 | A1 | 8/2011 | Egan et al. | |
| 2011/0258944 | A1 | 10/2011 | Radoane | |
| 2012/0216471 | A1 | 8/2012 | Manser et al. | |
| 2016/0244964 | A1 | 8/2016 | Hostetler et al. | |
| 2017/0167137 | A1 * | 6/2017 | Erickson | E04C 2/46 |
| 2018/0051460 | A1 * | 2/2018 | Sollie | E04B 1/7608 |
| 2018/0163396 | A1 * | 6/2018 | Boyles | B32B 5/18 |
| 2018/0183383 | A1 | 6/2018 | Lomasney | |
| 2018/0273291 | A1 | 9/2018 | Scherrer et al. | |
| 2020/0048904 | A1 | 2/2020 | Dombowsky et al. | |
| 2020/0232208 | A1 | 7/2020 | Cullen | |

FOREIGN PATENT DOCUMENTS

| | | |
|---|---|---|
| WO | 2018205646 A1 | 11/2018 |
| WO | 2020118147 A1 | 6/2020 |

OTHER PUBLICATIONS

Stofix Group, Stofix Brick Slip Cladding System Installation Video, https://www.youtube.com/watch?v=DI2BwkuNKs4, Jun. 7, 2017, 1 page.

Franzoni, E., Pigino, B., Graziani, G. et al. A new prefabricated external thermal insulation composite board with ceramic finishing for buildings retrofitting. Materials and Structures (2015), 16 pages.

"Tips for success with exterior insulation and finish systems", The Construction Specifier, downloaded, Aug. 20, 2020, 12 pages.

Ductal, External Thermal Insulation (ETI) Systems, downloaded Aug. 21, 2020, 7 pages.

* cited by examiner

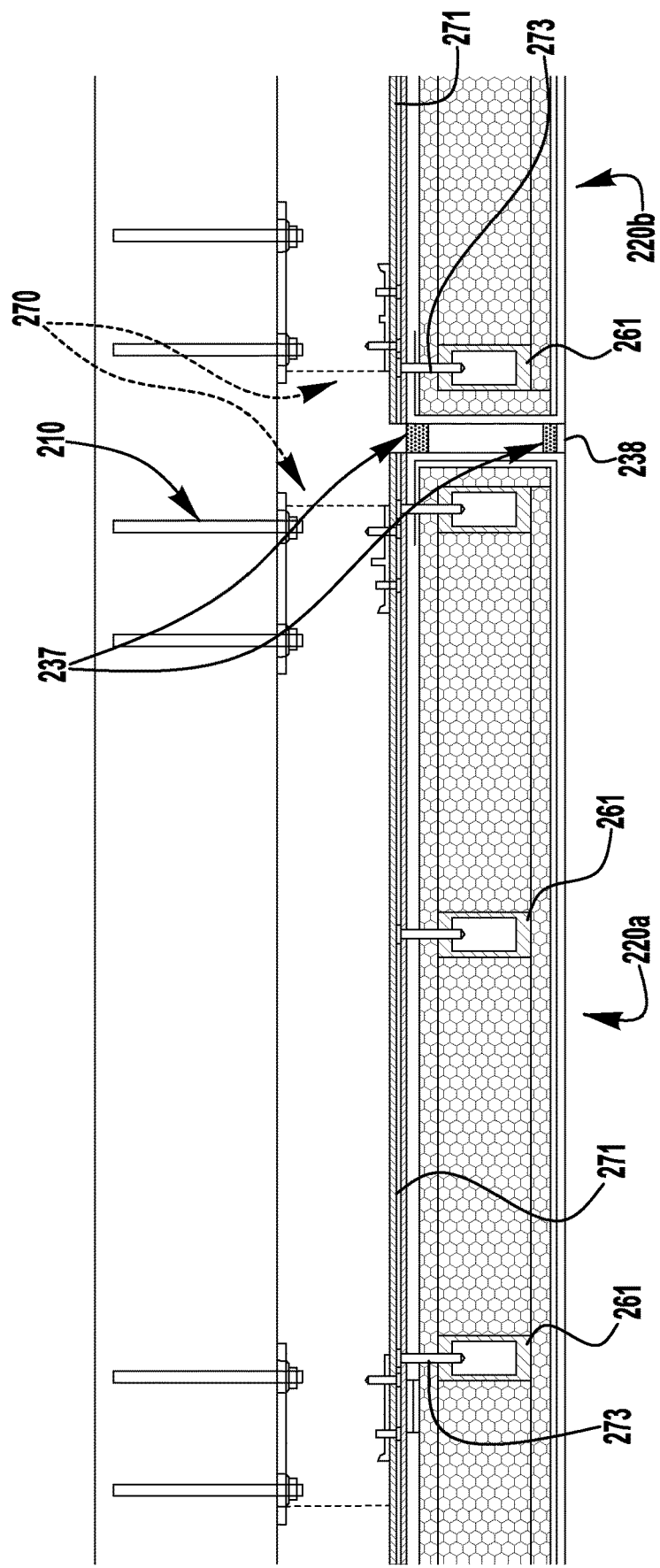

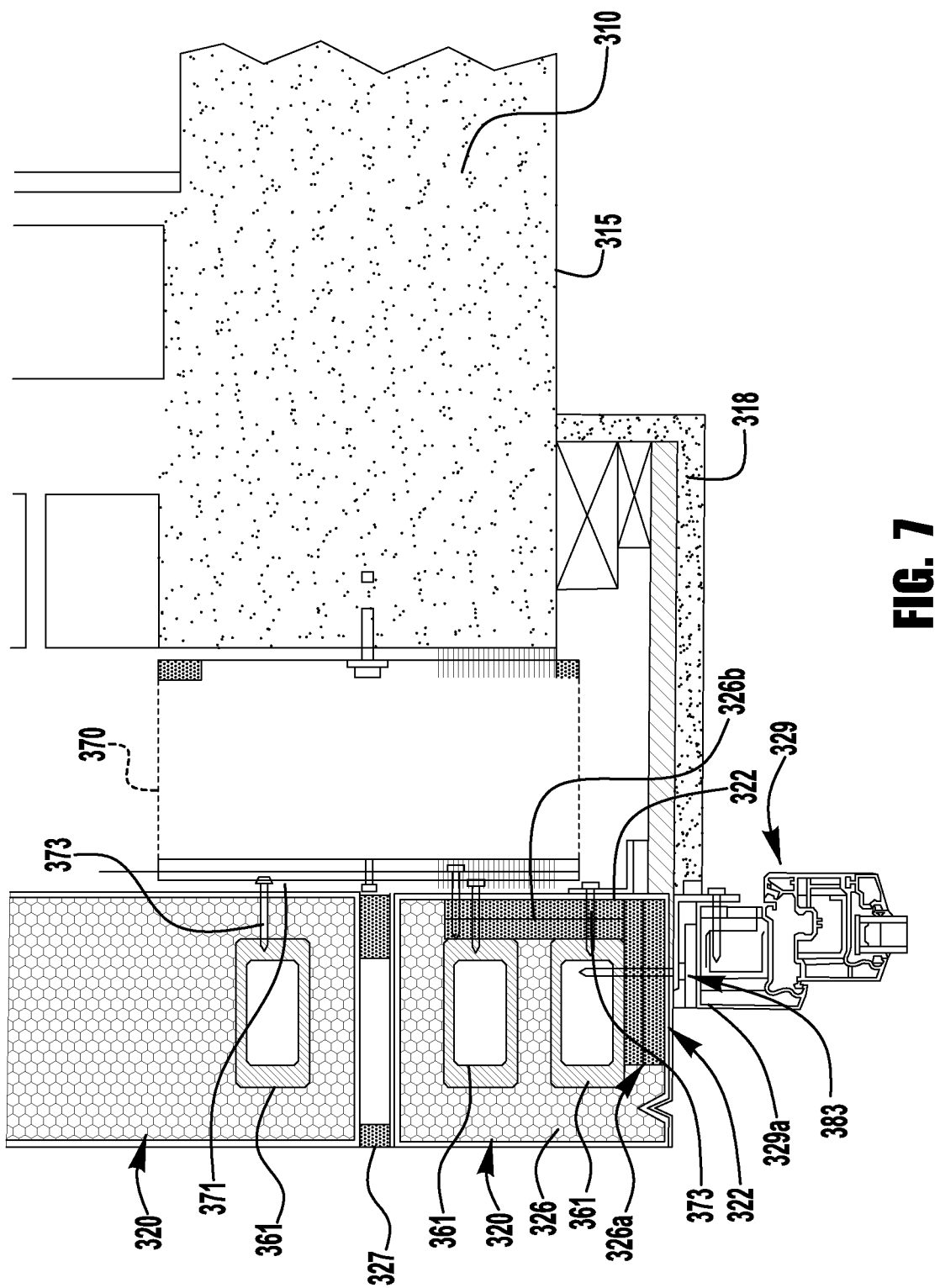

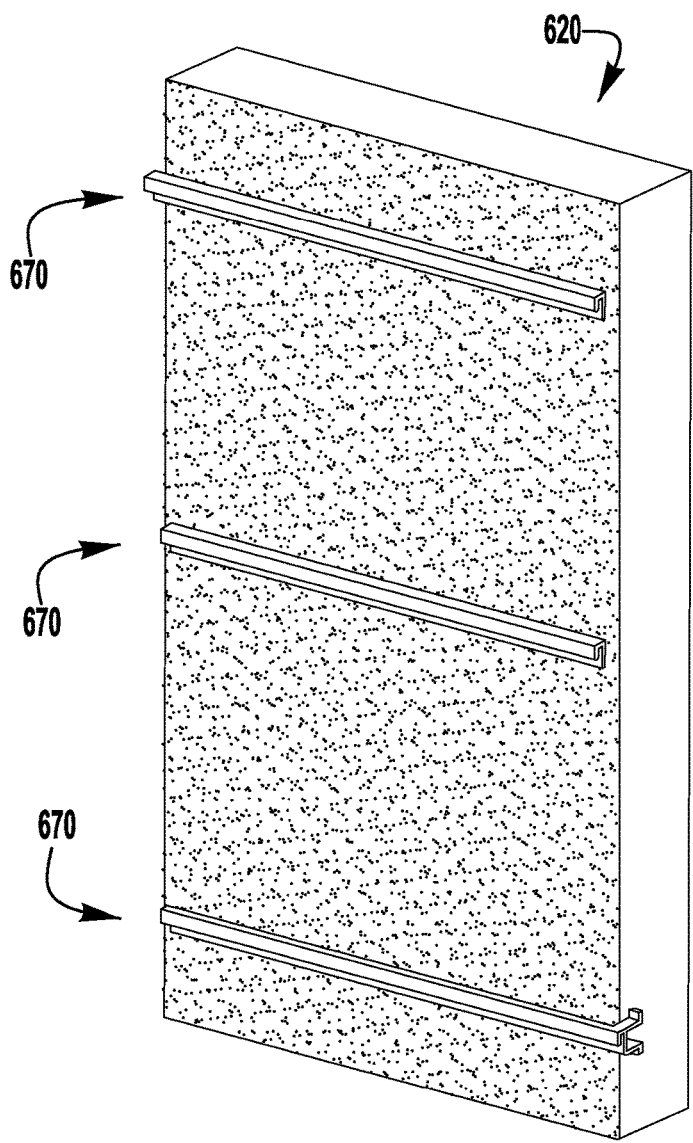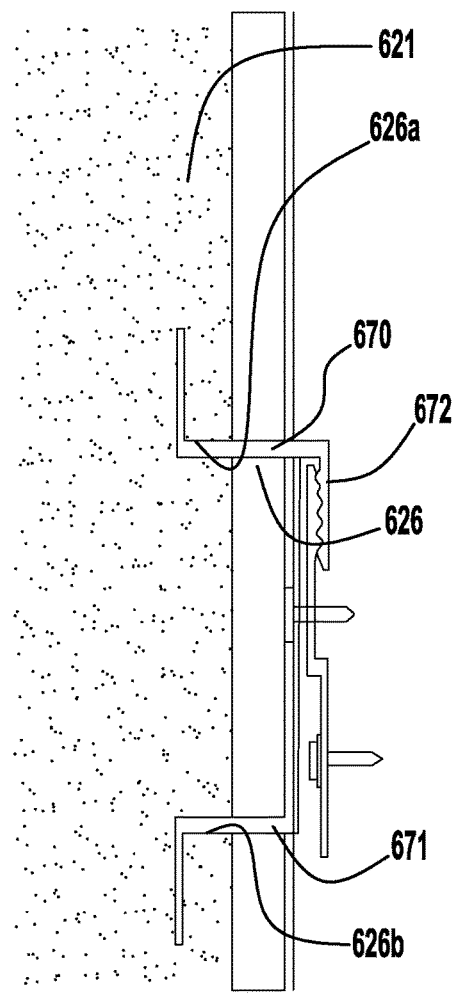
FIG. 10A  FIG. 10B

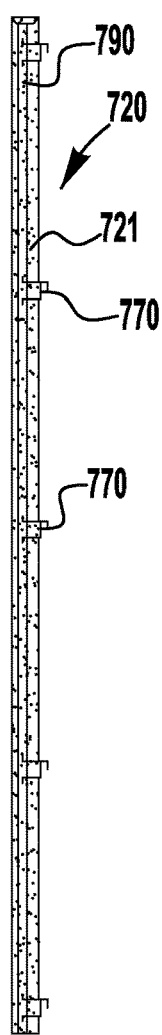
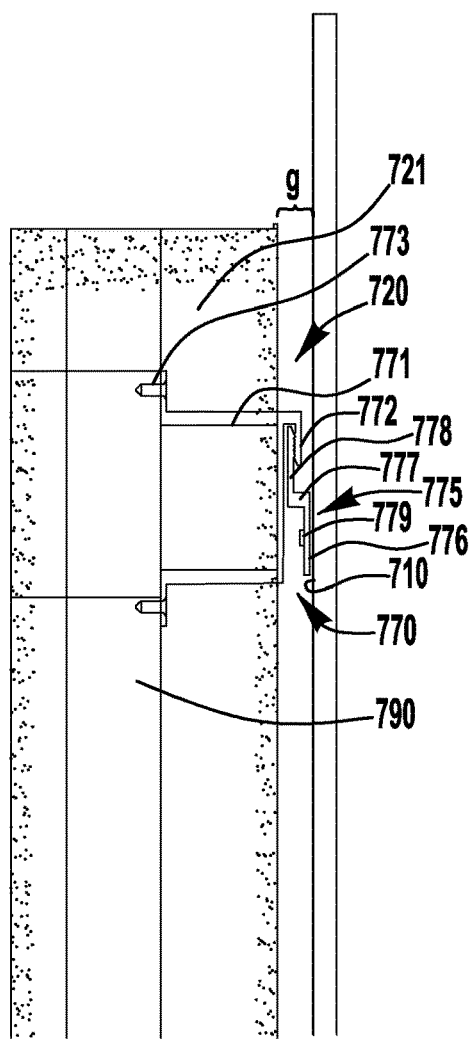
FIG. 11A  FIG. 11B
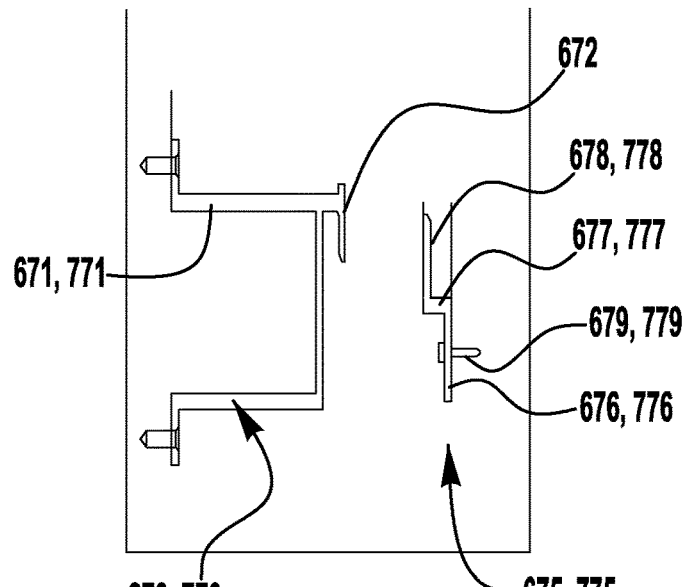
FIG. 12

STRUCTURAL INSULATED FINISHED CLADDING ASSEMBLIES

CROSS-REFERENCE TO RELATED APPLICATIONS

This application claims priority to and all benefit of U.S. Provisional Patent Application Ser. No. 63/114,833, filed on Nov. 17, 2020, entitled EXTERIOR INSULATING PANEL SYSTEM and U.S. Provisional Patent Application Ser. No. 63/159,684, filed on Mar. 11, 2021, entitled EXTERIOR INSULATING PANEL SYSTEMS the entire disclosures of each of which are fully incorporated herein by reference.

BACKGROUND

Exterior construction panels, such as insulating panels, may be attached to a substrate or exterior surface of a building to provide insulative and aesthetic enhancement to the building. Conventional steel frame reinforced panels typically require additional cross bracing or additional attachment points to the structure to accommodate the loads necessary to be a viable solution and create numerous thermal sinks diminishing the thermal value of the insulation added. Conventional lightweight panels lack the structural rigidity to support desirable aesthetic and structural features, including, for example, fenestrations.

SUMMARY

According to an exemplary embodiment of the present disclosure, an exterior building panel includes a panel body having a polymeric framing arrangement including an outer boundary portion extending around an outer perimeter of the panel body and a plurality of crossing frame members extending between opposed first and second sides of the outer boundary portion to define a plurality of cavities surrounded by the outer boundary portion, core insulation material disposed in each of the plurality of cavities, an insulation layer surrounding the framing arrangement and the core insulation material, and an insulating lamina coating covering the insulation layer.

According to another exemplary embodiment of the present disclosure, a method of mounting a structural insulated panel to a building substrate is contemplated. In the exemplary method, a structural insulated panel is provided, including a framing arrangement comprising a plurality of polymeric frame members defining an outer boundary portion extending around an outer perimeter of the panel body. At least one hanger element is secured to the panel body by installing at least one mounting fastener through the outer boundary portion of the framing arrangement. securing at least one hanger element to the panel body by installing at least one mounting fastener through the outer boundary portion of the framing arrangement. The at least one hanger element is secured to a corresponding mounting element disposed on the building substrate.

According to another exemplary embodiment of the present disclosure, a method of mounting a window to a structural insulated panel is contemplated. In the exemplary method, a structural insulated panel is provided, including a framing arrangement comprising a plurality of polymeric frame members defining an outer boundary portion extending around an outer perimeter of the panel body and an inner boundary portion defining an opening in the structural insulated panel body. A window is secured in the opening by installing at least one fastener through the inner boundary portion of the framing arrangement.

BRIEF DESCRIPTION OF THE DRAWINGS

Further features and advantages of the invention will become apparent from the following detailed description made with reference to the accompanying drawings, wherein:

FIG. 4A is a cross-sectional view of adjoining structural insulated panels secured to a wall of a building, according to an exemplary embodiment of the present disclosure;

FIG. 7 is a partial cross-sectional elevational view of the window bearing structural insulated panel and building substrate of FIGS. 6A and 6B;

FIG. 10A is a rear perspective view of a structural insulated panel having an exemplary mounting arrangement, according to an exemplary embodiment of the present disclosure;

FIG. 10B is a side cross-sectional view of a structural insulated panel, shown mounted to a building substrate by the mounting arrangement, according to an exemplary embodiment of the present disclosure;

FIG. 11A is a side cross-sectional view of a structural insulated panel having an exemplary mounting arrangement, according to an exemplary embodiment of the present disclosure;

FIG. 11B is an enlarged side cross-sectional partial view of the structural insulated panel of FIG. 11A, shown mounted to a building substrate, according to an exemplary embodiment of the present disclosure; and FIG. 12 is a side cross-sectional view of the mounting arrangement of FIGS. 10B and 11B.

DETAILED DESCRIPTION

This Detailed Description merely describes exemplary embodiments and is not intended to limit the scope of the claims in any way. Indeed, the invention as claimed is broader than and unlimited by the described embodiments, and the terms used have their full ordinary meaning.

Changes to building energy efficiency codes have prompted a multitude of efforts to make buildings more energy efficient, including, for example, improvements to electrical systems, windows, and HVAC systems. Exterior panel insulation presents an opportunity for retrofitting existing buildings for improved energy efficiency while adapting the exterior building envelope.

According to an exemplary aspect of the present disclosure, a plant-fabricated, lightweight building (e.g., façade, roof) panel may be configured to significantly improve a building's thermal performance, as well as bring the building enclosure up to all relevant building code requirements as it relates to energy performance and life safety. In one exemplary arrangement, the panels may include all necessary fenestrations (windows, doors, vents, etc.) so that the building occupants do not need to be displaced during construction. In some applications, panel attachment may allow for rapid installation on most existing buildings of one week or less.

Figure 1A:
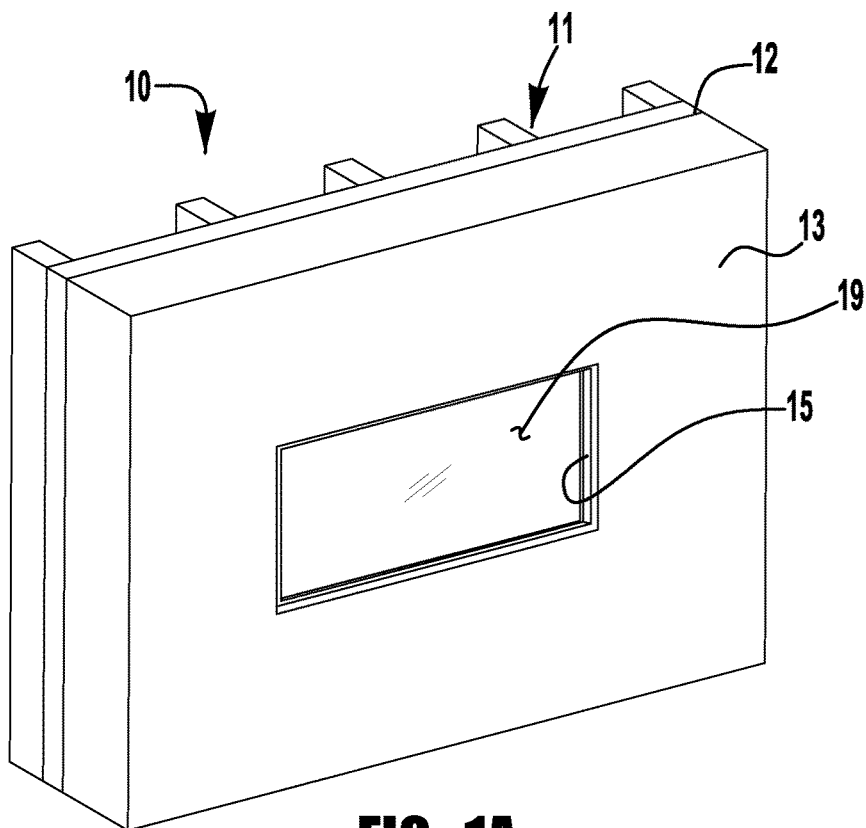
FIG. 1A is a front perspective view of an existing cladding/substrate for a building.
Figure 1B:
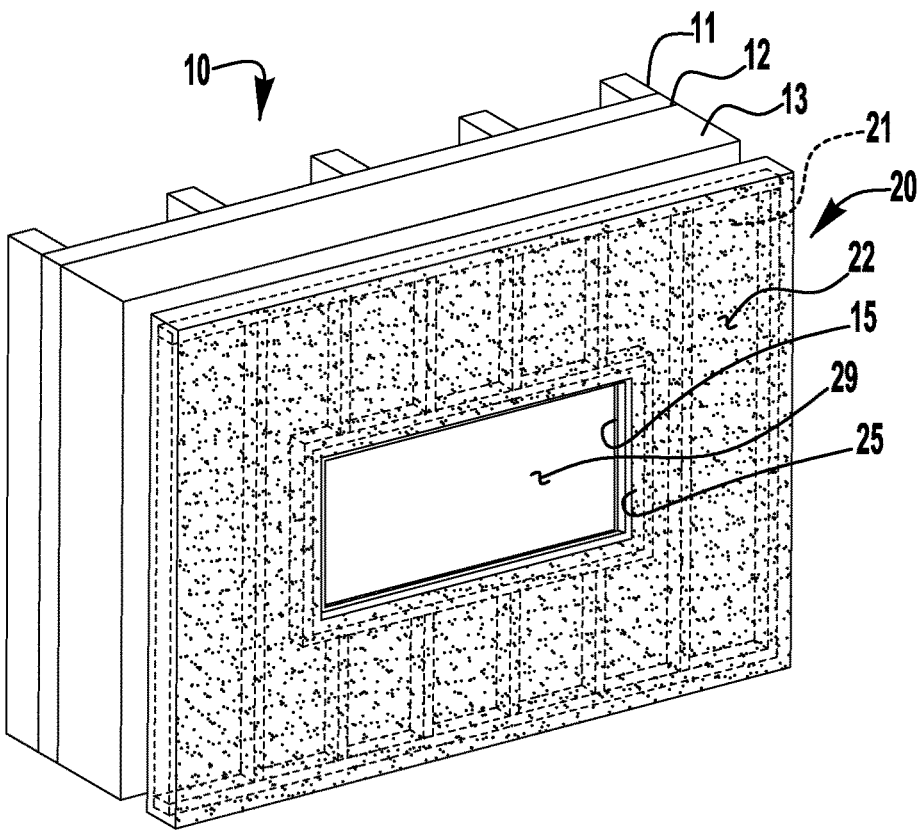
FIG. 1B is a front perspective view of the cladding/substrate of FIG. 1A, shown with an insulating panel secured to the cladding/substrate, according to an exemplary embodiment of the present disclosure.

FIG. 1A illustrates an existing building façade 10, including a frame portion 11, substrate 12, and cladding 13 (e.g., stucco), defining an opening 15 for a fenestration (e.g., window). FIG. 1B illustrates an exemplary structural insulated panel 20, secured to the building façade 10, including an insulation core 21 encapsulated by a lamina 22 and defining an opening 25 that aligns with the opening 15 in the façade. In such an arrangement, as described in greater detail below, the insulating panel 20 may be configured to support a fenestration 29 (e.g., window).

According to another exemplary aspect of the present disclosure, a structural insulated panel may include an internal framing arrangement configured to provide increased rigidity and support for panel-penetrating elements, such as, for example, windows, louvres, doors, and other such features.

Figure 2:
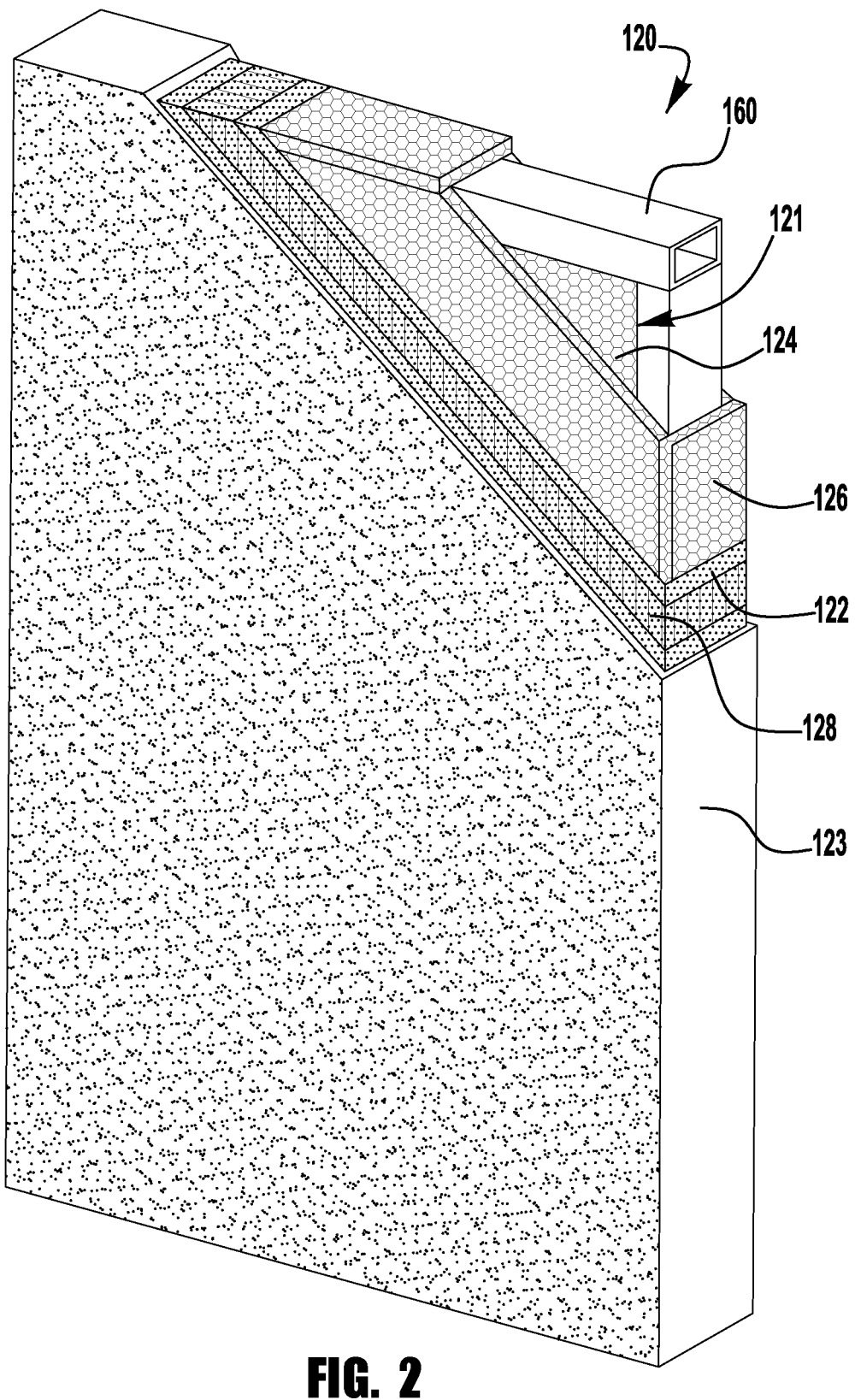
FIG. 2 is a perspective view of a structural insulated panel, according to an exemplary embodiment of the present disclosure, with a portion of the panel cut away to illustrate additional features of the panel.

FIG. 2 illustrates another exemplary structural insulated panel 120 including a rigid, frame reinforced insulation core 121 (e.g., expanded polystyrene and/or other foam insulating materials) including a rigid internal frame 160 surrounding a core insulation material 124, with the frame 160 and core insulation material 124 being surrounded or encapsulated by an insulation layer 126. The insulation layer 126 is encapsulated by a lamina 122 (e.g., an insulated stucco), and optionally coated by a finish layer 123 (e.g., a DPR Finish, manufactured by Dryvit). In some embodiments, the lamina 122 may include a fabric or mesh reinforcement 128. In other embodiments, the insulating panel 120 may additionally or alternatively include an integrated air barrier (e.g., ExoAir 230 vapor barrier membrane, manufactured by Tremco Inc.), for example, secured to or formed with the lamina 122 or finish layer 123.

An internal framing arrangement for an insulating panel may utilize a variety of configurations. In an exemplary arrangement, a plurality of frame members may be arranged to provide an outer boundary extending around an outer perimeter of the panel, a plurality of bays or cavities surrounded by the outer boundary and separated from each other by crossing or partitioning frame members, and, in panels carrying one or more windows or other panel-penetrating elements, an inner boundary extending around each of the one or more panel-penetrating elements.

Figure 2A:
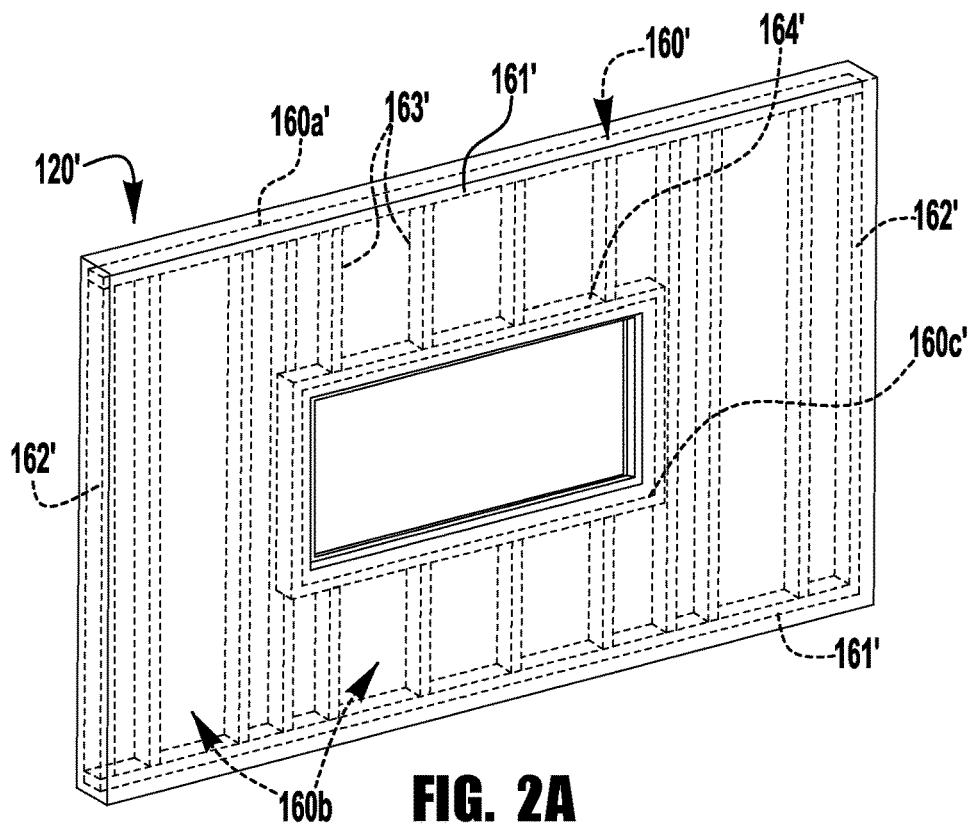
FIG. 2A is a front perspective view of another structural insulated panel, according to another exemplary embodiment of the present disclosure.

FIG. 2A illustrates an exemplary structural insulated panel 120' including an internal framing arrangement 160' including horizontal and vertical outer frame members 161', 162' defining an outer boundary portion 160a' extending around an outer perimeter of the panel 120', a plurality of bays or cavities 160b' surrounded by the outer boundary portion and separated from each other by crossing or partitioning frame members 163', and an inner boundary portion 160c', which may be formed from inner frame members 164' and/or bounding ones of the crossing frame members 163' to define an opening for attachment to, and retention of, a window element or fenestration, as described in greater detail below.

In some such embodiments, the internal framing may be a nonmetallic framing material, for example, to eliminate thermal bridging through the panel (i.e., providing a thermally broken design) and/or to minimize the carbon emissions related to manufacture of the insulated panel product, and a non-wood framing material, for example, to provide for greater durability and resistance to deterioration. In an exemplary arrangement, a framing arrangement is constructed, at least in part, using polymeric or plastic frame members, such as, for example, fiberglass reinforced plastic (FRP) frame members. One such exemplary FRP material is Dynarail Ladders, manufactured by Fibergrate. The FRP frame members may be attached to each other using a variety of arrangements. In an exemplary embodiment, the vertically extending outer frame members 162' and crossing frame members 163' are received in notches in the horizontal outer frame members 161', and are secured to the horizontal outer frame members using mechanical fasteners (e.g., screws) or adhesive.

Figure 2B:
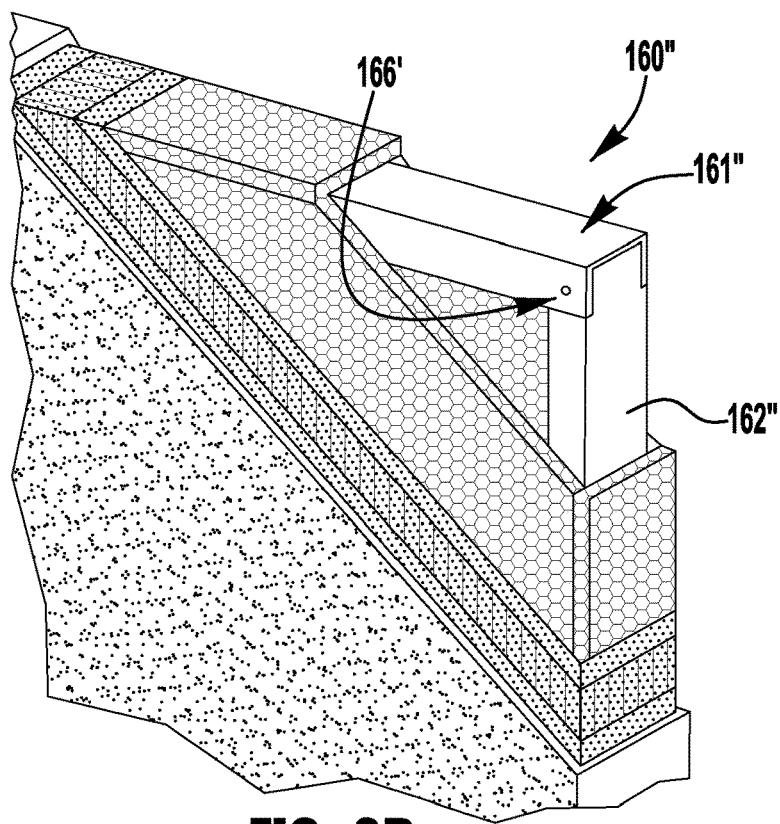
FIG. 2B is a partial perspective view of another structural insulated panel, according to another exemplary embodiment of the present disclosure, with a portion of the panel cut away to illustrate additional features of the panel.

In another exemplary embodiment, as shown in FIG. 2B, the horizontally extending frame members 161" may have a C-shaped cross section receiving end portions of the vertically extending frame members 162", which may be secured together using fasteners (e.g., screws 168"), adhesives, or other suitable arrangements.

Figure 2C:
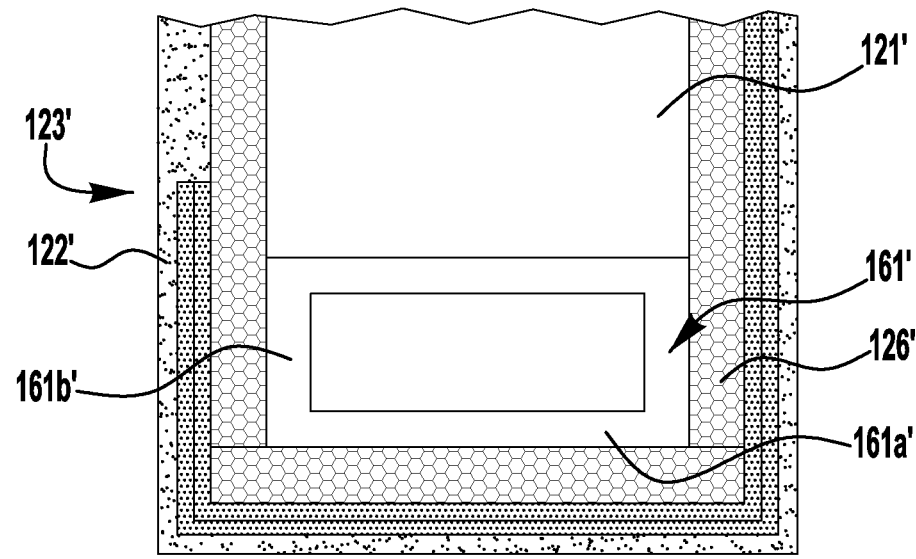
FIG. 2C is a partial cross-sectional side view of the panel of FIG. 2A.
Figure 2D:
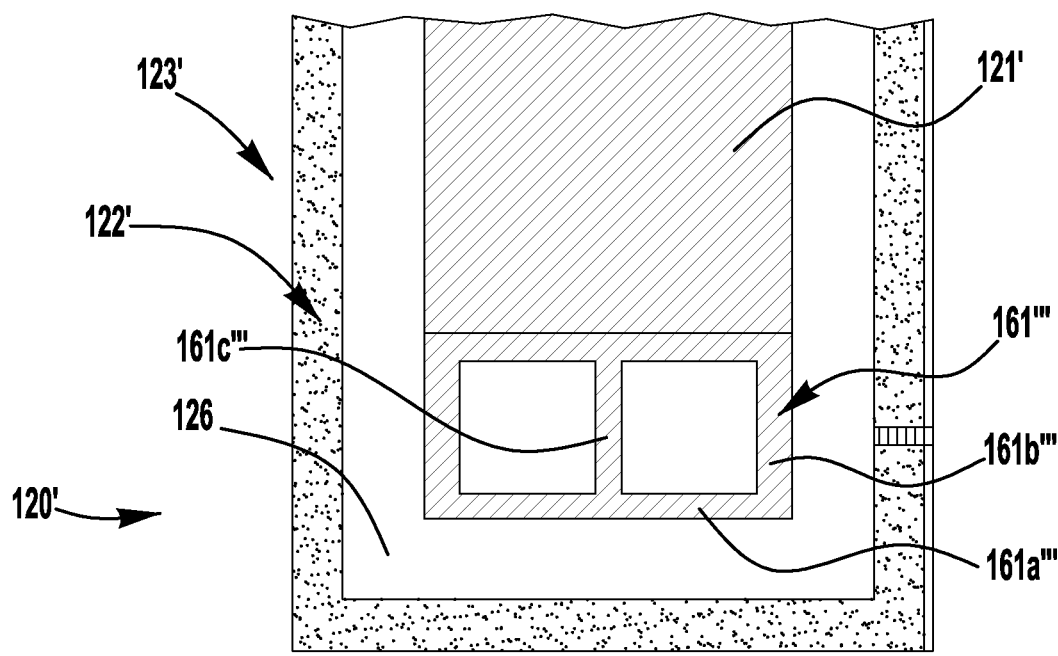
FIG. 2D is a partial cross-sectional side view of another structural insulated panel, according to another exemplary embodiment of the present disclosure.

While a variety of plastic frame members may be utilized, in some embodiments, plastic frame members may be provided with hollow channels or cavities, for example, to allow for use of a reduced amount of material (e.g., for reduced cost, reduced weight/density), while still providing rigid reinforcement of the panel, support for fenestration or other internal panel-piercing features, and/or to allow for attachment of the panel at slab edge conditions, to span from slab edge to slab edge in commercial construction. While many hollow channel configurations and frame member shapes may be used, in the illustrated embodiment, as shown in FIG. 2C, the frame member 161' may have a rectangular cross-sectional shape, with longer (e.g., about 3.5 inches) lateral walls 161a' extending between shorter (e.g., about 1.75 inches) end walls 161b. The end walls 161b' and lateral walls 161a' may have substantially the same thickness. In other embodiments, the end walls 161b' may be thicker (e.g., about 0.38 inches thick) than the lateral walls 161a' and reinforcing wall 161c' (e.g., about 0.25 inches thick), for example, to provide additional rigidity against twisting deformation. As shown in FIG. 2D, the frame member 161' may alternatively have a rectangular "FIG. 8" cross-sectional shape, with a reinforcing wall 161c''' extending across a mid-portion of the frame member 161', parallel to the end walls 161b'.

The cavities or bays 160b' defined by the internal framing arrangement 160' may receive and retain core insulation material 124' selected to suit the specific application or environment in which the panel 120' is to be used. For example, an aerogel or polyisocyanurate (POLYISO) material may be selected for increased thermal resistance, a mineral wool core insulation material may be selected for environments requiring greater fire resistance, and an extruded polystyrene (EPS) material may be selected for budget conscious projects. The core insulation material may be installed as slabs or blocks of insulation material, blankets of insulation material, loose fill insulation material, and/or spray foam insulation material. Multiple layers of different types of insulation material may additionally or alternatively be used.

In still other embodiments, other internal reinforcing framing arrangements may be used, including, for example, an internal grate or lattice frame.

The internal framing 160' and core insulation 124' may be surrounded or encapsulated by an insulation layer 126', for example, an extruded polystyrene (EPS) panel layer providing additional thermal insulation and a substrate to facilitate application of one or more coatings. In an exemplary embodiment, EPS insulation panels (e.g., ¾ inch thick panels) are secured to the front and rear sides and the outer and inner perimeter portions 160a', 160c' of the internal framing 160' and core insulation material 124', for example, using hot glue or other suitable attachment. Insulation panels may likewise be secured to the outer periphery of the outer perimeter portion 160a' to fully encapsulate the insulation core 121'.

An insulating lamina or coating 122', such as, for example, a plaster or stucco-like layer, may be applied to the insulation panel layer 126', for example, to provide additional fire resistance and/or a suitable substrate for application of an exterior finish layer 123' to provide a desired exterior appearance for the panel 120'. The lamina may be applied, for example, by a trowel or spray application, and may be approximately ½ inch thick. A reinforcing fabric or mesh (e.g., a woven glass fiber mesh) may be embedded in the insulating lamina material, for example, to provide further reinforcement. Exemplary insulating lamina materials include, for example, insulated stucco (e.g., U-STUCCO™), a dry mix, polymer-modified, cementitious adhesive (e.g., Genesis® DM or Primus® DM, each manufactured by Dryvit Systems, Inc.).

Figure 2E:
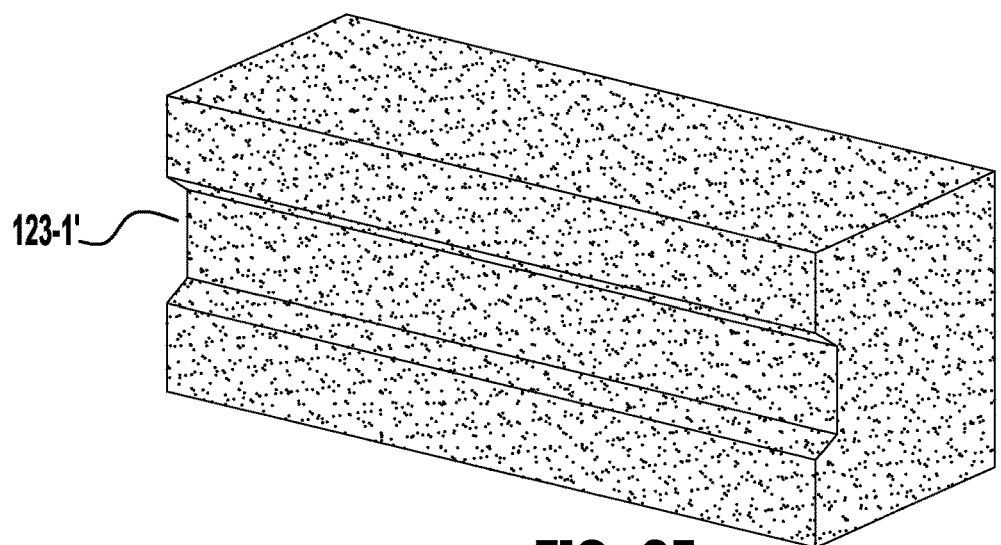
FIGS. 2E, 2F, and 2G are perspective views of exemplary structural insulated panels having different aesthetic reveals formed in the exterior finish layer.
Figure 2F:
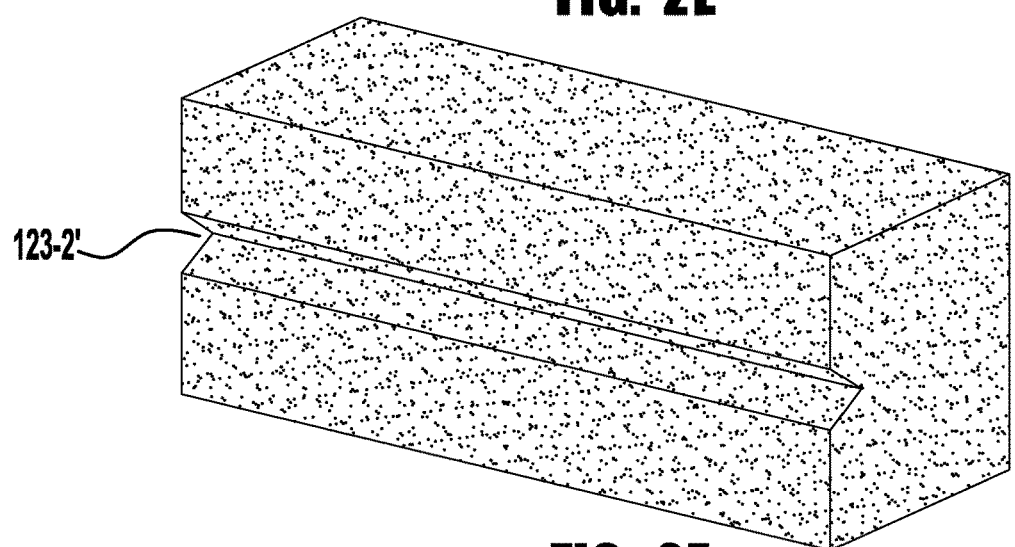
Figure 2G:
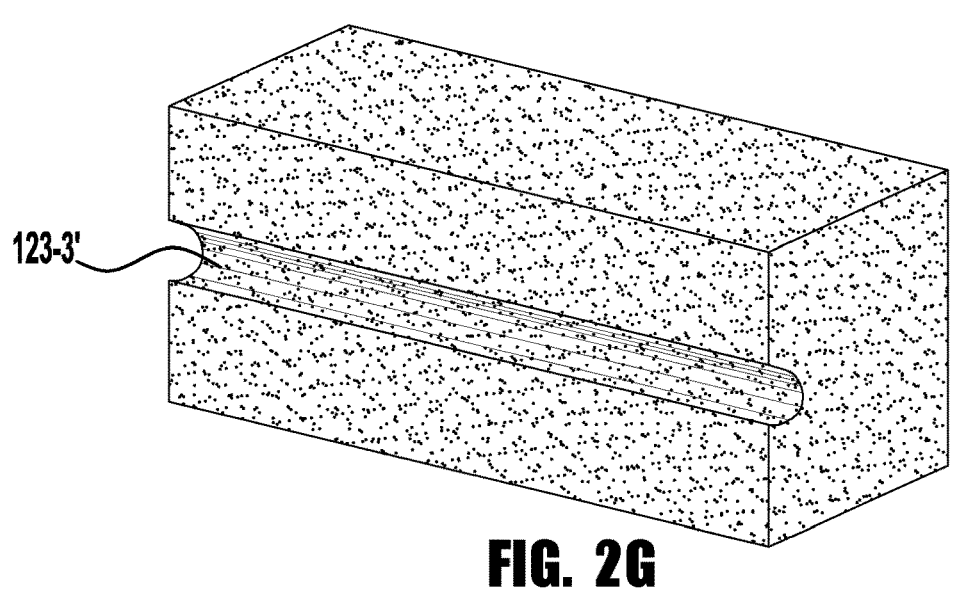

The exterior finish layer 123' may provide a variety of colors and textures, using, for example, a mesh-reinforced acrylic architectural finish (e.g., a DPR Finish, manufactured by Dryvit), capable of providing various aesthetic finishes, including, for example, simulated wood grain, stone, stucco, and metal panel surfaces. Various aesthetic reveals 123-1, 123-2, 123-3 (FIGS. 2E, 2F, 2G) may be formed in the exterior finish layer 123' as desired.

In an exemplary arrangement, an exterior insulation panel having a fiberglass reinforced plastic (FRP) internal frame, frame retained core insulating material, and continuous insulation (panel insulation and/or applied insulation coating) can provide a structural insulated panel (SIP) that is thermally broken with a high effective R value (e.g., total R value of at least R-22 for a 6 inch thick panel at 75° F., with the ability to optimize with selected composite insulations for R-values in excess of R-30 for a 6 inch panel), and that can be provided in larger panel sizes (e.g., 8-10 ft×12-20 ft, or about 8 ft 3 in tall×about 15 ft wide). The lightweight construction (e.g., less than about 10 lb/ft2, or about 9.5 lb/ft2) and rigid internal framing of such a panel facilitates mounting to an existing structure without requiring additional structural support, such as a dead-load support at grade (e.g., a concrete footing). The selected materials (e.g., insulation encapsulating lamina) may additionally provide optimal fire resistance (e.g., NFPA 285 compliance, inclusion of components rated to Class A per ASTM E84). The insulation materials may provide enhanced acoustical insulative performance (e.g., Sound Transmission Class (STC) rating of at least 50, Outdoor/Indoor Transmission Class (OITC) of at least 38).

In an exemplary method of constructing the structural insulated panel 120', FRP frame members 161', 162', 163', 164' are joined (e.g., by mechanically fastened interlocking notch or C-shaped frame engagement, as discussed above) to form the internal framing 160', and an insulating (e.g., EPS) panel material 126' is secured to one side of the framing (e.g., hot glue adhesion). Core insulation material 124' is installed in the cavities 160b' defined by the framing 160', and insulating panel material 126' is secured to the other side of the framing to enclose the core insulating material, and to the outer and inner perimeter framing 160a', 160c'. An insulative coating (e.g., insulated stucco) 122' is applied to the exterior surfaces of the insulating panel material 126', for example, by trowel or spray application. Once the insulative coating has dried/cured, an architectural finish layer 123' may be applied to the exterior surfaces of the insulative coating.

Figure 3:
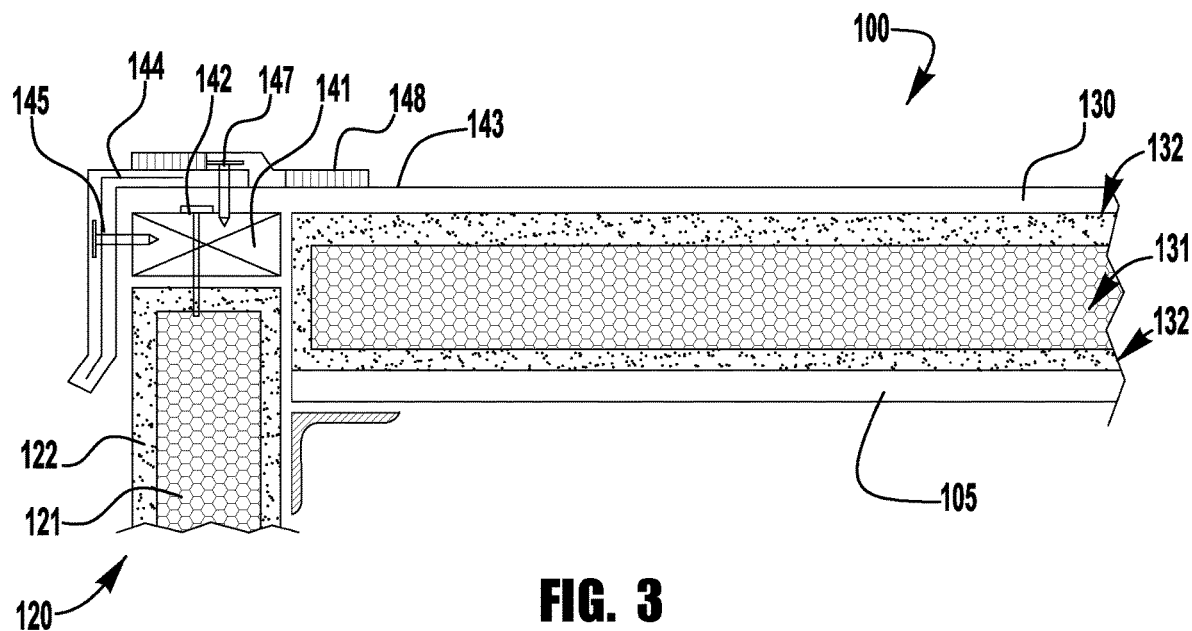
FIG. 3 is a cross-sectional view of structural insulated panels secured to a roof and wall of a building, according to an exemplary embodiment of the present disclosure.

As contemplated herein, structural insulated panels may be provided on exterior wall and roof substrates to provide an insulating building envelope. Many different suitable arrangements may be used to provide such attachment. FIG. 3 illustrates an exemplary insulated building arrangement 100 including an existing roof 105 to which wall and roof structural insulated panels 120, 130 are secured. As shown, the roof insulating panel 130 may be secured directly to the existing roof 105 (e.g., by a suitable adhesive), and may include a rigid insulation core 131 encapsulated by a lamina 132, similar to the wall insulating panel 120. In other embodiments, either or both of the wall and roof structural insulated panels may include an internal frame arrangement with composite core insulation and surrounding panel insulation and insulative and/or architectural finish coatings, similar to the wall insulating panel 120' of FIGS. 2A-2D.

In the exemplary arrangement, a connection between the insulating panels 120, 130 is reinforced by a block member 141 (e.g., wood blocking) secured to the wall insulating panel 120 by fasteners 142 (e.g., nails, wood screws). The roof insulating panel 130, the block member 141, and the adjoining end of the wall insulating panel 120 may be covered by a waterproof membrane 143 (e.g., a hybrid thermoplastic alloy coated fabric membrane, such as, for example, TremPly® KEE membrane, manufactured by Tremco Inc.), adhered to the block member 141 and insulating panels 120, 130, for example, by a urethane foam or water-based adhesive. A cleat 144 may be secured over the edge of the block member 141 (e.g., using fasteners 145) for retention of the membrane 143, and a metal drip edge 146 may be secured over the cleat (e.g., by fasteners 147 secured to the block member 141), for example, to direct water away from the wall insulating panel 120. To cover and seal the drip edge seam and fasteners 147, a membrane strip 148 (e.g., thermoplastic alloy (TPA) membrane strip) may be adhered to the drip edge 146 and membrane 143 (e.g., by heat welding). To facilitate adhesion, the drip edge 146 may include a TPA coating to facilitate heat welding of the membrane strip 148 to the drip edge.

Exemplary roofing arrangements may include additional mounted arrangements, including, for example, an attached metal gutter and/or an anchor bar. In some embodiments, the roof panel may be configured for attachment of other roofing elements, including, for example, photovoltaic cells.

Figure 4:
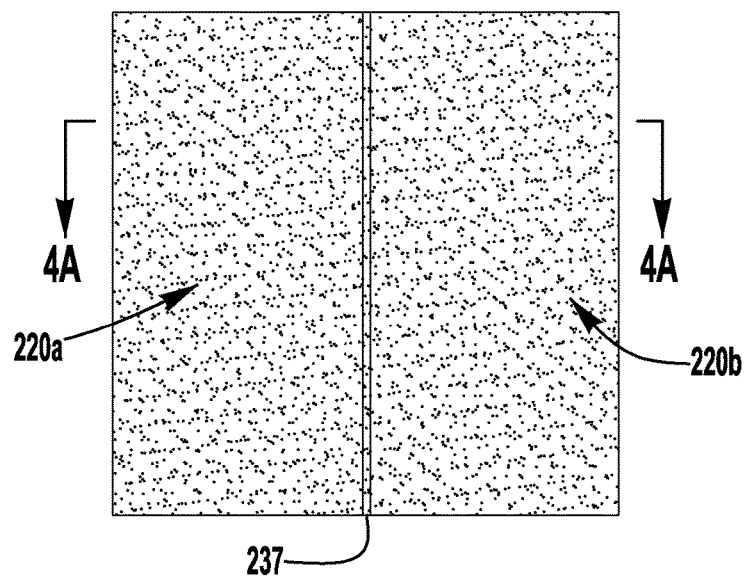
FIG. 4 is a front view of adjoining structural insulated panels, according to an exemplary embodiment of the present disclosure.

In some arrangements, structural insulated panels may be mounted laterally adjacent to each other and joined by a sealing arrangement mounted to a building substrate 210. FIG. 4 illustrates an arrangement including adjacent structural insulated panels 220a, 220b. As shown in the cross-sectional view of FIG. 4A, the panels 220a, 220b may be mounted to a building substrate 210 (using a mounting arrangement, shown schematically at 270), and sealingly joined to each other by a joint seal 237. In an exemplary embodiment, a closed cell foam joint seal may be used (e.g., an engineered profile joint seal manufactured by Willseal®), for example, with a field applied sealant bead (e.g., silicone sealant) adhering the sides of the joint seal 237 to the panels 220a, 220b. A silicone topping 238 may be applied to an exterior surface of the joint seal 237. The surfaces of the panels 220a, 220b with which the joint seal 237 adheres may be provided with an adhesion promoting coating, such as, for example, an acrylic coating (e.g., Dryvit Demandit® Smooth acrylic architectural coating).

In some such applications, the panels 220a, 220b and joint seals 260 therebetween may provide a sufficient air and vapor resistive barrier to meet applicable building code requirements. In other applications, an air and vapor barrier membrane (e.g., ExoAir 230 vapor barrier membrane, manufactured by Tremco Inc.) may be adhered to the exterior surface of the building substrate, or integrated into the insulating panel air barrier, for example, secured to or formed with the lamina or finish layer.

To provide for rigid, reinforced attachment of the panel 220 to the building substrate 210, the mounting arrangement 270 may include one or more hanger elements 271 secured to the panel body by one or more mounting fasteners 273 installed through one or more of the panel frame members 261, as shown in FIG. 4A. As shown, the mounting arrangement may provide for a gap or offset (e.g., 4-6 inches) between the building substrate and the panel, for example, to accommodate building system components such as, for example, mechanical system components, plumbing, ductwork, and electrical system components.

Figure 5A:
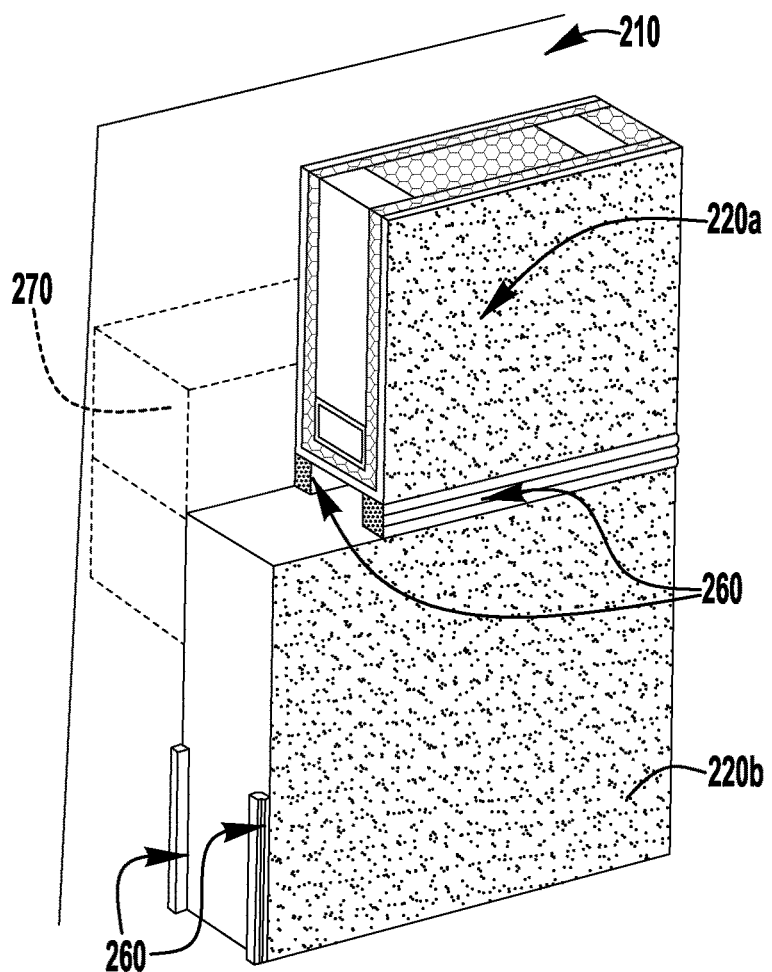
FIG. 5A is a partial perspective view of adjoining structural insulated panels secured to a wall of a building, according to another exemplary embodiment of the present disclosure.
Figure 5B:
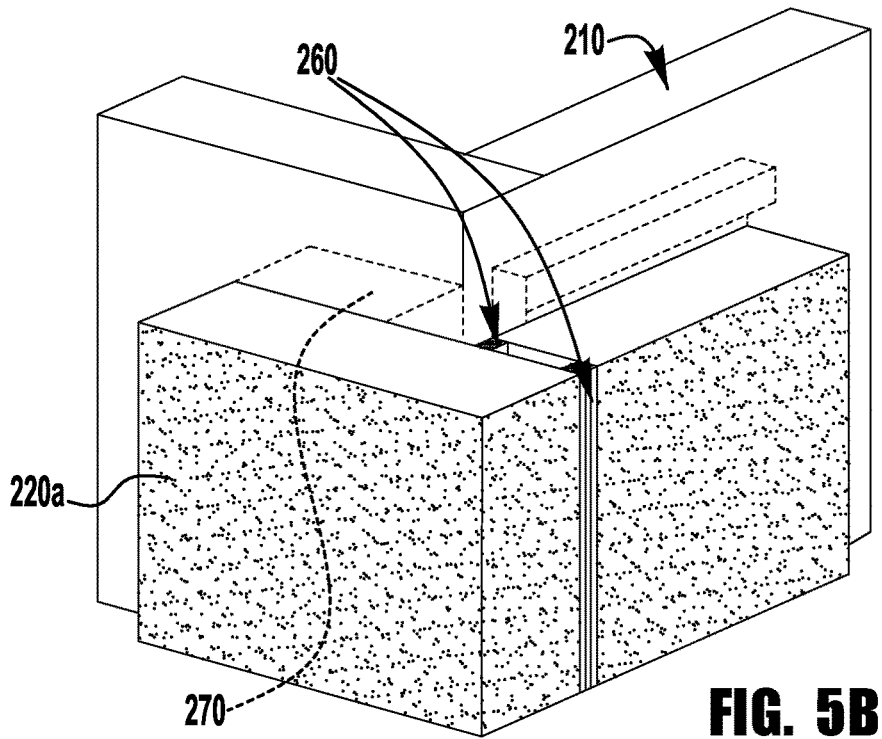
FIG. 5B is a partial perspective view of adjoining structural insulated panels secured to a wall of a building, according to another exemplary embodiment of the present disclosure.
Figure 5C:
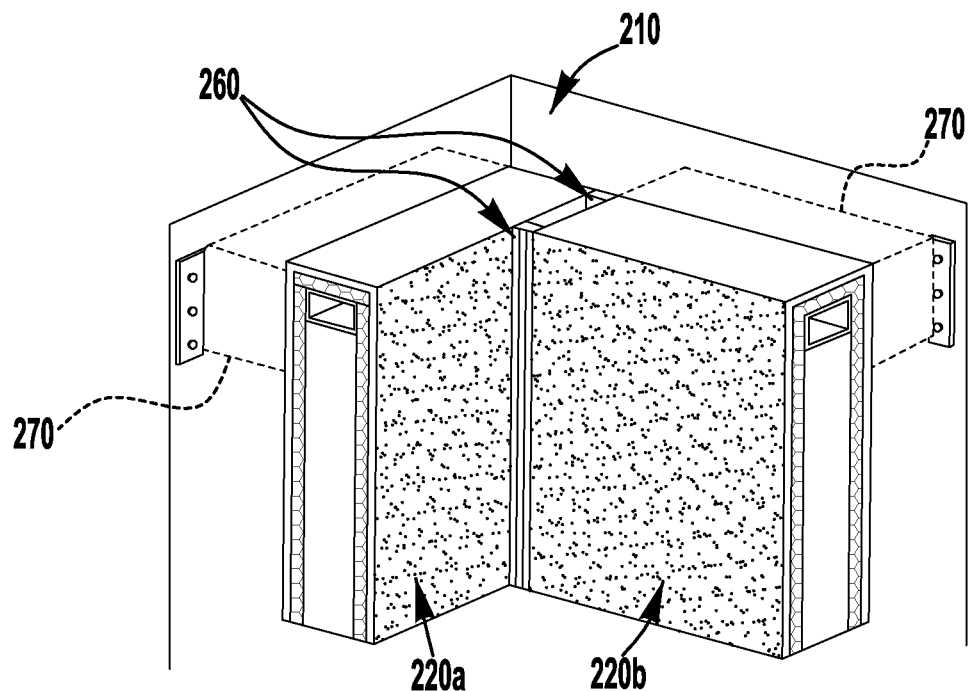
FIG. 5C is a partial perspective view of adjoining structural insulated panels secured to a wall of a building, according to another exemplary embodiment of the present disclosure.
Figure 5D:
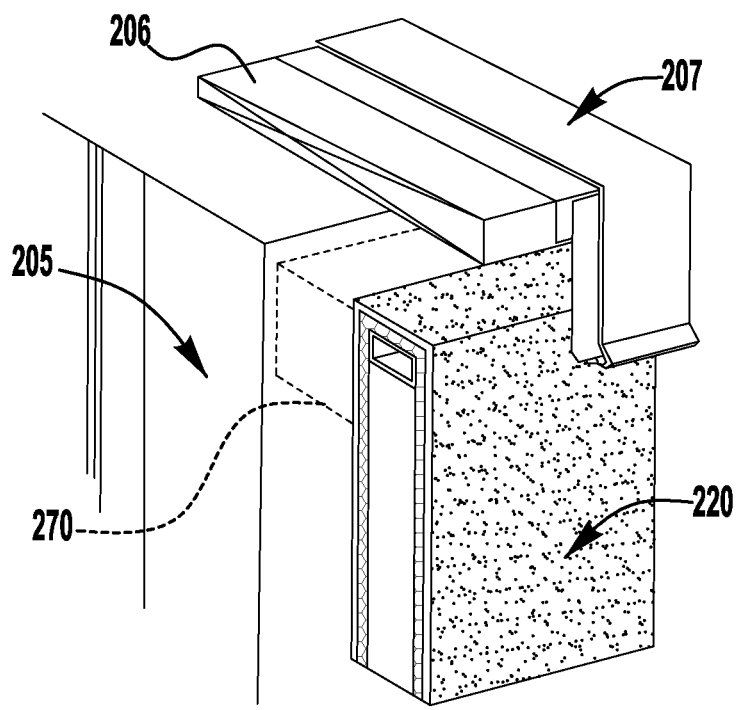
FIG. 5D is a partial perspective view of a structural insulated panel secured to a roof portion of a building, according to another exemplary embodiment of the present disclosure.
Figure 5E:
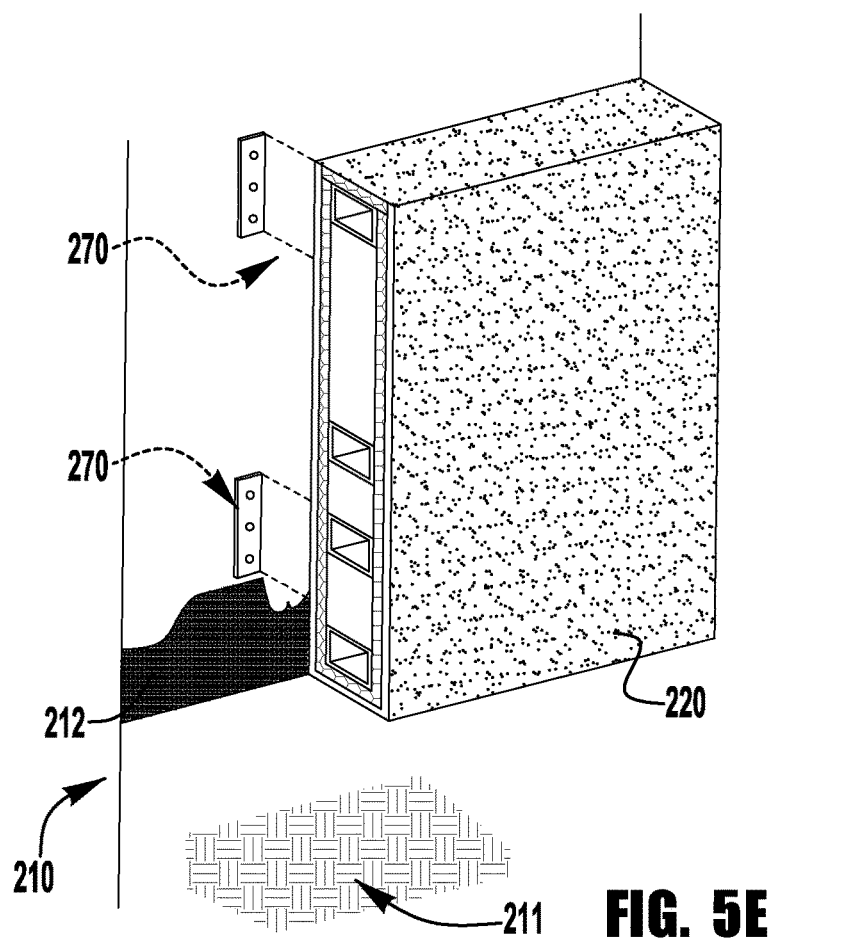
FIG. 5E is a partial perspective view of a structural insulated panel secured to a foundation wall portion of a building, according to another exemplary embodiment of the present disclosure.
Figure 5F:
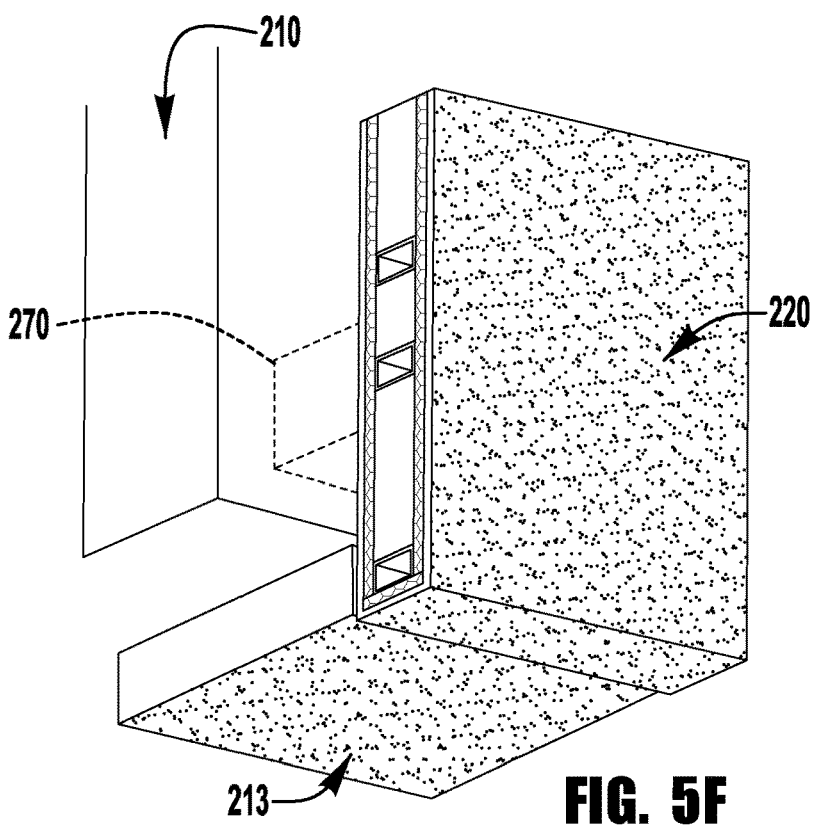
FIG. 5F is a partial perspective view of a structural insulated panel adjoined with a soffit and secured to a wall of a building, according to another exemplary embodiment of the present disclosure.

Similar joint seals and mounting arrangements may be used to seal and mount vertically adjacent structural insulated panels 220a, 220b (FIG. 5A), outside corner adjoining structural insulated panels 220a, 220b (FIG. 5B), and inside corner adjoining structural insulated panels 220a, 220b (FIG. 5C). As shown in FIG. 5D, structural insulated panels 220 may be similarly mounted to a roof assembly 205, for example, below a parapet cap 206 and cap flashing 207. As shown in FIG. 5E, structural insulated panels 220 may be similarly mounted at the base of a foundation wall 210, for example, with an air/water-resistive barrier coating or waterproofing 212 installed between the panel 220 and the foundation wall, and/or above (e.g., at least 8 inches above) a slope grade 211 away from the foundation wall 210. As shown in FIG. 5F, structural insulated panels 220 may be similarly mounted adjacent to an insulated soffit 213, with the panel sealingly joined with the soffit using, for example, any of the joint seals or sealants described herein.

Figure 6A:
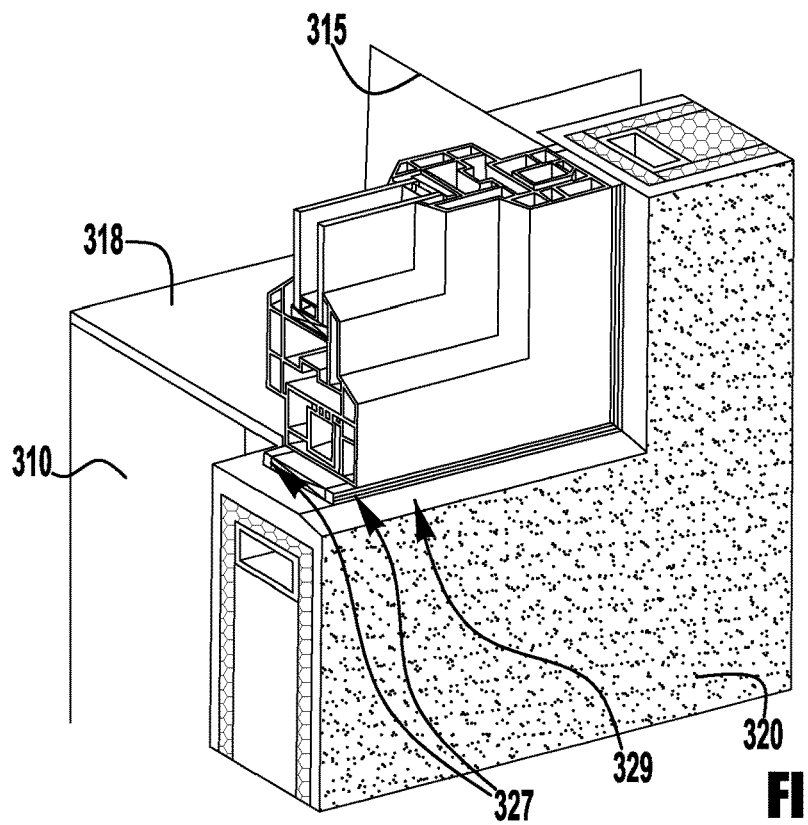
FIGS. 6A and 6B are a partial cross-sectional perspective views of a window bearing structural insulated panel secured to a building substrate, according to an exemplary embodiment of the present disclosure.
Figure 6B:
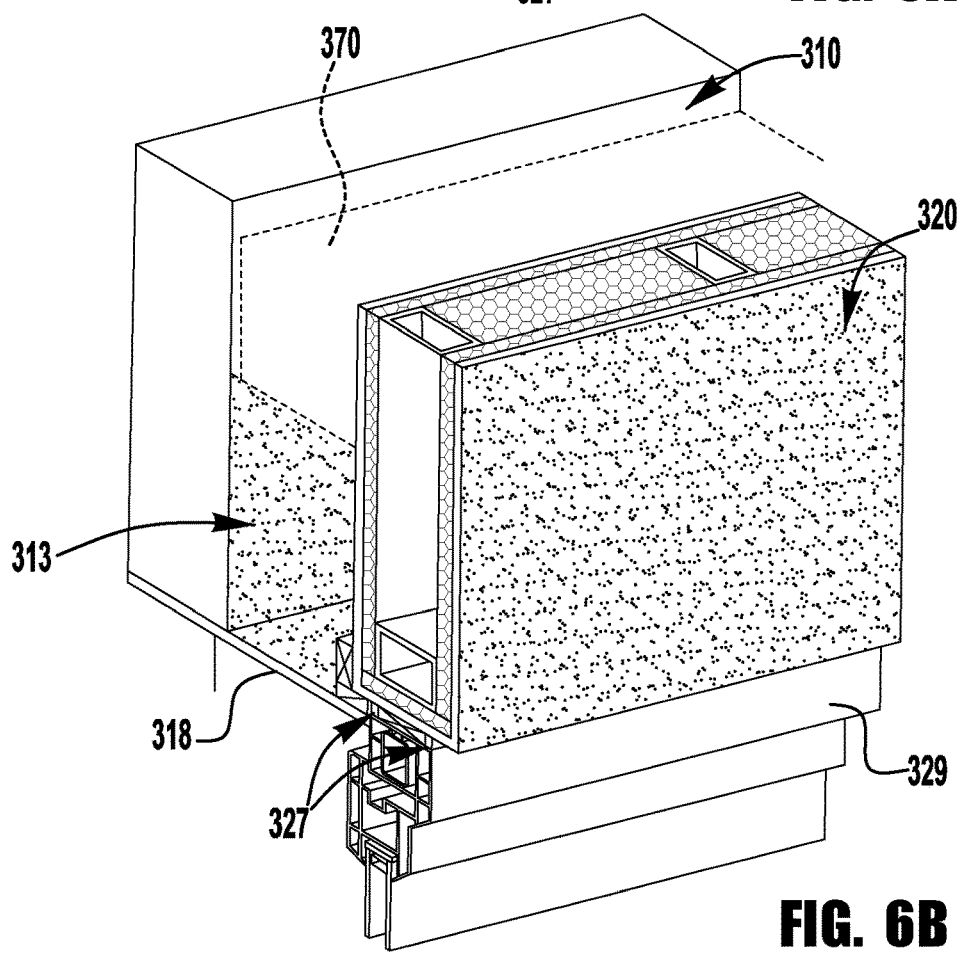

According to another aspect of the present application, exterior insulating wall panels applied to fenestration-carrying façades may include arrangements for supporting a fenestration, such that the fenestration may be installed along with the insulating panel. FIGS. 6A and 6B illustrate partial cross-sectional perspective views of an exterior wall insulating panel 320 secured to a building wall 310 having a rough window opening 315 (with window removed or not installed), with the panel 320 carrying a fenestration 329 (e.g., double glazed window, or triple glazed, thermally broken window assembly) in an opening 325 in the insulating panel 320. Joint seals 327 (e.g., Willseal 600S and Colorseal foam joint seals) and/or sealants (e.g., Tremco sealant) may be used to sealingly join the window to the insulating panel 320. A flexible flashing (not shown) may additionally be used, secured to the building wall and extending between the insulating panel 320 and the window 329. An interior finish wrap 318 may be secured to the building wall opening 315, for example, to conceal the rough opening in the building wall. An insulation material 313 (e.g., mineral wool) may be installed around the window opening (e.g., around the finish wrap 318) between the building wall 310 and the panel 320 to provide additional insulation. As shown in FIG. 6A, the opening 325 may be provided with a chamfered edge, for example, to facilitate drainage and/or for aesthetic purposes.

To provide for rigid, reinforced attachment of the window 329 to the panel 320, an outer frame portion 329a of the window 329 may be secured to the panel body by one or more mounting fasteners 383 installed through one or more of the reinforcing panel frame members 361, as shown in FIG. 7. To further reinforce the window attachment, and/or to limit or eliminate fastener compression of the panel insulation materials, a portion of the insulation layer 326 of the panel body 320 may include a rigid block 326a (e.g., one or more cement boards; for example, two ½ inch thick cement boards) disposed between the polymeric frame member(s) 361 and the insulated lamina coating 322 in alignment with one or more window fasteners 383. Similarly, a portion of the insulation layer 326 of the panel body 320 may include a rigid block 326b (e.g., one or more cement boards; for example, two ½ inch thick cement boards) disposed between the polymeric frame member(s) 361 and the insulated lamina coating 322 in alignment with one or more hanger element mounting fasteners 373, to further reinforce the mounting arrangement, and/or to limit or eliminate fastener compression of the panel insulation materials.

Figure 8:
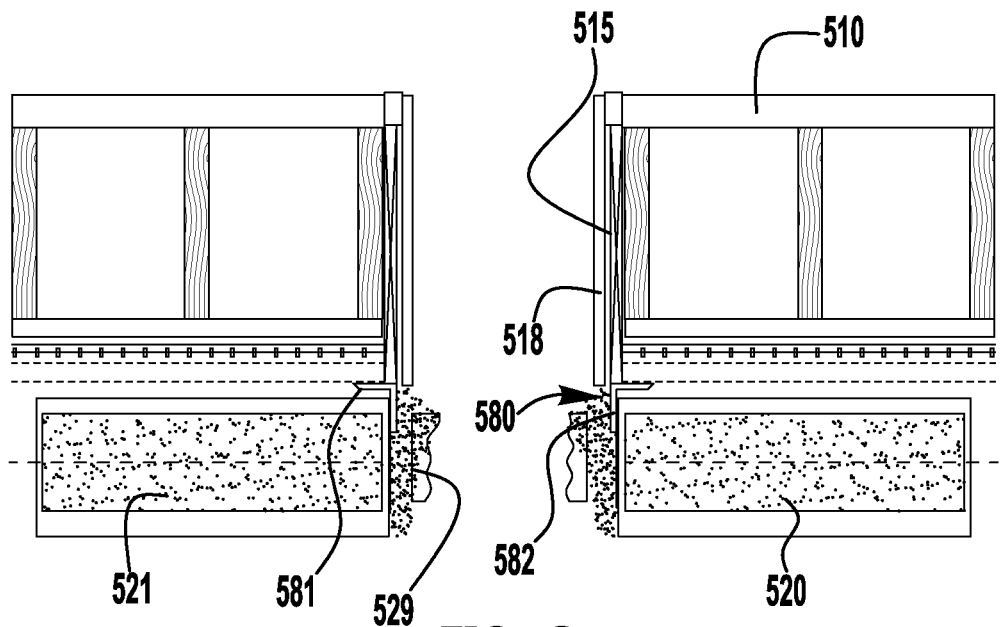
FIG. 8 is a partial cross-sectional view of a building façade shown with a window bearing structural insulated panel and window supporting sleeve secured to the façade, according to an exemplary embodiment of the present disclosure.
Figures 9A, 9B:
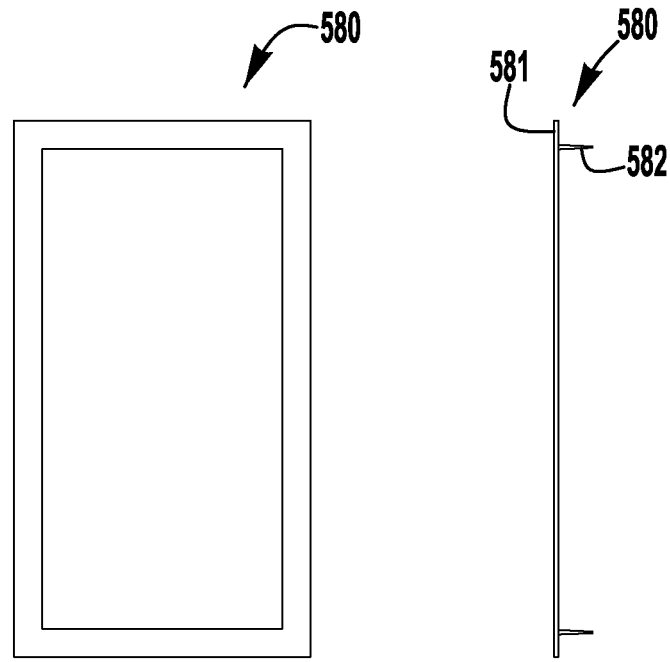
FIG. 9A is a front view of a window sleeve, according to an exemplary embodiment of the present disclosure.
FIG. 9B is a side view of the window sleeve of FIG. 9A.

According to another aspect of the present disclosure, an exterior wall insulating panel may be provided with structure for reinforced support of an attached fenestration. In an exemplary embodiment, a window supporting sleeve member, sized to fit around or through the existing window rough opening, provides a reinforced attachment for the window. FIG. 8 illustrates an exterior wall insulating panel 520 secured to a building wall 510 having a window removed, with a window sleeve 580 including a flange portion 581 secured to an exterior of the rough opening 515 in the building wall, and a protruding leg portion 582 with which a fenestration 529 (e.g., double glazed window, or triple glazed, thermally broken window assembly) is secured. While any suitably dimensioned window sleeve may be used, in an exemplary embodiment, the flange portion 581 and leg portion 582 are both about 4 inches long. FIGS. 9A and 9B illustrate front and side views of an exemplary window sleeve 580.

A variety of mounting arrangements may be used to secure one or more structural insulated panels to an exterior building substrate, including, for example, curtain wall mounting systems (e.g., as manufactured by Knight Wall Systems, ECO Cladding, and Cladiator), and may include a hanger element attached to or embedded in the panel body of the structural insulated panel, as described herein.

According to an exemplary aspect of the present disclosure, a structural insulated panel may be provided with one or more hanger elements embedded in the body of the panel for mechanical attachment to the exterior surface of a building (e.g., façade, roof). Exemplary mounting arrangements are described in co-pending U.S. patent application Ser. No. 17/388,730, filed on Jul. 29, 2021, the entire disclosure of which is incorporated herein by reference.

FIGS. 10A and 10B illustrate exemplary structural insulated panels 620 including hanger bodies 670 embedded in the insulation core 621 of the panel. Hat channels 626 are formed in the panel 620, having first and second L-shaped leg portions or grooves 626a, 626b extending into the insulation core 621, toward the front surface and toward the top and bottom longitudinal surfaces of the panel.

As shown in the exemplary embodiment of FIG. 10B (and shown in FIG. 12), the hanger bodies 670 may include a hat-shaped base portion 671 received in the channels 626, and a hook portion 672 extending rearward from the base portion 671. A Z-shaped frame member or mounting rail 675 includes a base wall portion 676 securable to the building wall 610 by one or more fasteners 679 installed through corresponding mounting holes in the mounting rail, a bight portion 677 extending forward from the base wall portion 676, and a flanged portion 678 extending vertically upward from the bight portion 677. The panel 620 is secured to the building wall 610 by hooking the hook portion 672 over the flanged portion 678 of the mounting rail 675 to secure the panel 620 on the mounting rail 675. End portions of the hanger bodies 670, extending beyond the ends of the panel 620, may include fasteners 674 installed through the base portion 671 to further secure the panel 620 to the building wall 610.

The hanger bodies 670 and mounting rails 675 may be provided in a suitable rigid material, including, for example, extruded aluminum or steel.

FIGS. 11A and 11B illustrate exemplary structural insulated panels 720 including hanger bodies 770 embedded in the insulation core 721 of the panel and attached to a reinforcement member 790 embedded within the panel for attachment to and support of a fenestration, as discussed above. Hat channels 726 are formed in the panel 720, having first and second L-shaped leg portions or grooves 726a, 726b extending into the insulation core 721, toward the front surface and toward the top and bottom longitudinal surfaces of the panel.

As shown in the exemplary embodiment of FIG. 11B (and shown in FIG. 12), the hanger bodies 770 may include a hat-shaped base portion 771 received in the channels 726, and a hook portion 772 extending rearward from the base portion 771. A Z-shaped frame member or mounting rail 775 includes a base wall portion 776 securable to the building wall 710 by one or more fasteners 779 installed through corresponding mounting holes in the mounting rail, a bight portion 777 extending forward from the base wall portion 776, and a flanged portion 778 extending vertically upward from the bight portion 777. The panel 720 is secured to the building wall 710 by hooking the hook portion 772 over the flanged portion 778 of the mounting rail 775 to secure the panel 720 on the mounting rail 775.

As shown in FIG. 11B, the mounting arrangement may be configured to provide a gap or offset g between a rear surface 724 of the panel 720 and a front surface of the building wall 710. In an exemplary arrangement, the gap g may be sized to accommodate building system components such as, for example, mechanical system components, plumbing, ductwork, and electrical system components. While any suitable gap may be provided, in an exemplary embodiment a 4-6 inch gap g is provided between the panels 720 and the building wall 710.

The base portion 771 may additionally be secured to a portion of the insulation core 721 using fasteners 773 installed through flanged ends of the base portion. In a panel having an internal frame arrangement (e.g., polymeric frame members, as described herein), the fasteners 773 may be secured to the frame members, for example, to provide further reinforced attachment of the hanger elements.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present disclosure may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

The invention claimed is:

1. A structural insulated panel comprising:
   a panel body including:
      a polymeric framing arrangement including:
         opposed first and second outer frame members secured to and extending between opposed third and fourth outer frame members to define an outer boundary portion extending around an outer perimeter of the panel body,
         a plurality of crossing frame members secured to the first and second outer frame members to define a plurality of cavities surrounded by the outer boundary portion, and
         an inner boundary portion secured to one or more of the plurality of crossing frame members and defining an opening in the panel body;
      a panel penetrating element secured to the inner boundary portion and at least partially disposed in the opening in the panel body;
      core insulation material disposed in each of the plurality of cavities;
      an insulation layer surrounding the framing arrangement and the core insulation material; and
      an insulating lamina coating covering the insulation layer.

2. The panel of claim 1, wherein the first, second, third, and fourth outer frame members comprise fiberglass reinforced plastic.

3. The panel of claim 1, wherein at least the third and fourth outer frame members have a rectangular cross-section.

4. The panel of claim 1, wherein the first and second frame members have a C-shaped cross-section receiving end portions of the crossing frame members and the third and fourth frame members between first and second sides of the C-shaped cross-section.

5. The panel of claim 1, wherein the insulation layer comprises insulation panels secured to front and rear sides of the polymeric framing arrangement.

6. The panel of claim 1, wherein the insulation layer comprises insulation panels secured to an outer periphery of the outer boundary portion.

7. The panel of claim 1, wherein the insulation layer comprises extruded polystyrene.

8. The panel of claim 1, wherein the panel penetrating element comprises a window.

9. The panel of claim 8, further comprising a sealant joint between the panel body opening and an outer frame portion of the window.

10. The panel of claim 8, further comprising a window supporting sleeve member including a leg portion secured between an outer frame portion of the window and the opening in the panel body, and a flange portion extending laterally outward from the leg portion for attachment to an exterior of a rough opening in a building wall.

11. The panel of claim 1, further comprising at least one hanger element secured to a rear side of the panel body by one or more mounting fasteners installed through the polymeric framing arrangement.

12. The panel of claim 11, wherein a portion of the insulation layer comprises a rigid block disposed between the polymeric framing arrangement and the insulated lamina coating in alignment with the one or more mounting fasteners.

13. The panel of claim 11, wherein the at least one hanger element is embedded in a channel formed in the panel body.

14. The panel of claim 11, wherein the one or more of the first, second, third, and fourth outer frame members comprise hollow frame members, the at least one hanger element being secured to one or more of the first, second, third, and fourth outer frame members by the one or more mounting fasteners installed through outer wall portions of the one or more of the first, second, third, and fourth outer frame members.

15. The panel of claim 1, wherein the inner boundary portion of the polymeric framing arrangement comprises opposed first and second inner frame members secured to and extending between opposed third and fourth inner frame members, the first and second inner frame members being secured to one or more of the plurality of crossing frame members.

16. The panel of claim 15, wherein the window is secured to the inner boundary portion by one or more fasteners installed through an outer frame portion of the window and the one or more of the first, second, third, and fourth inner frame members.

17. The panel of claim 16, wherein a portion of the insulation layer comprises a rigid block disposed between the polymeric framing arrangement and the insulated lamina coating in alignment with the one or more fasteners.

18. The panel of claim 15, wherein the first, second, third, and fourth inner frame members comprise hollow frame members, the panel penetrating element being secured to one or more of the first, second, third, and fourth inner frame members by fasteners installed through outer wall portions of the corresponding hollow frame members.

19. A method of constructing a structural insulated panel, the method comprising:
   joining a plurality of polymeric frame members to form a frame defining an outer boundary portion and a plurality of cavities;
   securing a first insulating panel to a first side of the frame arrangement;
   installing insulation material in the plurality of cavities;
   securing a second insulating panel to a second side of the frame to enclose the core insulating material; and
   applying an insulative coating to exterior surfaces of the first and second insulating panels.

20. A method of mounting a structural insulated panel to a building substrate defining a rough opening, the method comprising:

providing a structural insulated panel having a panel body including a framing arrangement comprising a plurality of polymeric frame members defining an outer boundary portion extending around an outer perimeter of the panel body and an inner boundary portion defining an opening in the panel body, with a panel penetrating element secured to the inner boundary portion and at least partially disposed in the opening in the panel body;

securing at least one hanger element to the panel body by installing at least one mounting fastener through the outer boundary portion of the framing arrangement; and securing the at least one hanger element to a corresponding mounting element disposed on the building substrate, such that the panel penetrating element is aligned with the rough opening in the building substrate.

\* \* \* \* \*